United States Patent
Branz et al.

(10) Patent No.: US 6,904,339 B2
(45) Date of Patent: Jun. 7, 2005

(54) METHOD FOR CODING CONTROL DEVICES IN MEANS OF CONVEYANCE

(75) Inventors: Guenter Branz, Stuttgart (DE); Thomas Kersten, Filderstadt (DE); Christian Kuehn, Esslingen (DE); Volker Seefried, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 65 days.

(21) Appl. No.: 10/428,149

(22) Filed: May 2, 2003

(65) Prior Publication Data

US 2004/0024473 A1 Feb. 5, 2004

(30) Foreign Application Priority Data

May 3, 2002 (DE) .......................................... 102 19 832

(51) Int. Cl.⁷ ................................................ G06F 7/00
(52) U.S. Cl. .......................................................... 701/1
(58) Field of Search ............................... 701/1, 33, 35, 701/36

(56) References Cited

FOREIGN PATENT DOCUMENTS

| DE | 42 11 650 A1 | 4/1992 |
|---|---|---|
| DE | 43 15 494 C1 | 5/1993 |
| DE | 100 00 337 A1 | 1/2000 |
| DE | 100 44 917 A1 | 9/2000 |

*Primary Examiner*—Yonel Beaulieu
(74) *Attorney, Agent, or Firm*—Crowell & Moring LLP

(57) ABSTRACT

In a method and apparatus for configuration of networked controllers in a vehicle that can be manufactured with various outfitting variants (that is, differing components and features), at least one controller being configurable to different outfitting variants of the vehicle, characterizing information is stored for the various outfitting variants of the vehicle. The data for configuring the controllers are stored in an outfitting variant controller on board the vehicle. A particular controller that is to be configured in this manner transmits characterizing information to the outfitting variant controller for configuration to a specified outfitting variant of the vehicle in which it is installed. The outfitting variant controller assembles the data for configuring the particular controller using the characterizing information and the data stored on the outfitting variant controller. The data assembled in this manner are written into a memory unit of the particular controller to configure to accommodate the specified outfitting variant.

10 Claims, 3 Drawing Sheets

| | ID | VALUE |
|---|---|---|
| CLIMATE CONTROL | 1 | 1111101010 |
| 5th GEAR | 2 | 0001011 |
| Vmax | 7 | 111101 |
| SPECIAL GLASS | 13 | 0 |
| Airbag | 5 | C1010010010 |

Fig. 3

METHOD FOR CODING CONTROL DEVICES IN MEANS OF CONVEYANCE

BACKGROUND AND SUMMARY OF THE INVENTION

This application claims the priority of German patent application 102 19 832.2, filed May 3, 2002, the disclosure of which is expressly incorporated by reference herein.

The invention concerns a method and apparatus for configuring control devices in a vehicle.

To reduce the great number of variants of control devices required for motor vehicles having different outfittings (that is, different combinations of components and equipment), control devices have been adapted by coding them to accommodate the various standards in a particular outfitting. For example, the control devices must be adapted to differing motor outfittings of the motor vehicles. For this purpose, coding data of the control devices are ascertained from a special database during the manufacture of motor vehicle variants, and written into the control devices during production of the motor vehicle.

If a control device is exchanged at a later point in time (for example in the event of a defect), the new control device must again receive a coding corresponding to the individual motor vehicle. At present, ascertaining and furnishing the coding data require an expensive and time-intensive process, for which special technical knowledge and detailed motor vehicle information are needed. The coding data ascertained are written into the new control device through an external diagnostic device. A further disadvantage of this process is that, in exchanging control units, customer-specific adjustments of the control device are lost.

The coding of control devices is generally accomplished by changing the parameter settings in the operating software or by exchanging whole program parts. The coding process therewith corresponds to a software engineering converted configuration process, so that coding and configuration can be equated in this context.

One object of the present invention is to furnish a method and apparatus for efficient configuration of control devices in a vehicle.

This and other objects and advantages are achieved by the method and apparatus in accordance with the invention, in which data for configuring the control devices for the various outfitting variations are filed in an outfitting variant control device of the vehicle. A particular controller transfers characterization information to the outfitting variant control device for configuration to accommodate the outfitting variant of the vehicle. The outfitting variant control device compiles the data to configure the particular controller using the characterization information and the data filed in the outfitting variant control device. The data compiled in this manner are written into the memory of the particular controller in order to configure it for certain outfitting variant.

The process of controller exchange in the workshops is simplified by the process according to the invention, which also saves time for the owner of the vehicle. Moreover, erroneous codings by the workshop are minimized since ascertaining the configuration data need not take place outside the vehicle.

Manufacture of the vehicle can also be simplified by furnishing the configuration data for the various outfitting variants in a controller of vehicle. The controllers installed in the vehicle during manufacture can be configured to specified outfitting variants using the particular controller.

The method and apparatus according to the invention are especially useful in motor vehicles, since the large number of outfittings as well as changes in outfitting motor vehicles increases enormously in the automobile industry.

A further advantage of the method is its tolerance for changes in the configuration data. A change or an omission of configuration data for a controller does not influence the configuration process. In particular the value of characterization information can be ascertained by means of depositing rules for configuration of controllers, although this is not filed in the outfitting variant control device.

Preferably the coding can continue to be used through external diagnostic devices.

A further advantage of the process is its capacity for redundant storage of configuration data of controllers, in a controller of the vehicle. In particular, the configuration settings adapted to the owner of the vehicle also remain preserved following the change in controllers, since these are redundantly stored in the outfitting variant control device. Moreover, the configuration data can be dynamically extended in that the configuration data from already coded controllers, not known to the outfitting variant controller, are also redundantly stored.

Preferably the configuration is conducted only in a safe operating status of the vehicle, thereby it is assuring that the controller to be configured is not in use, and can be configured by the outfitting variant.

Various possibilities exist for advantageously perfecting and further developing the theory of the present invention.

Other objects, advantages and novel features of the present invention will become apparent from the following detailed description of the invention when considered in conjunction with the accompanying drawings.

BRIEF DESCRIPTION OF THE DRAWINGS

FIG. 3 illustrates an exemplary table of coding data.

DETAILED DESCRIPTION OF THE DRAWINGS

Figure 1:
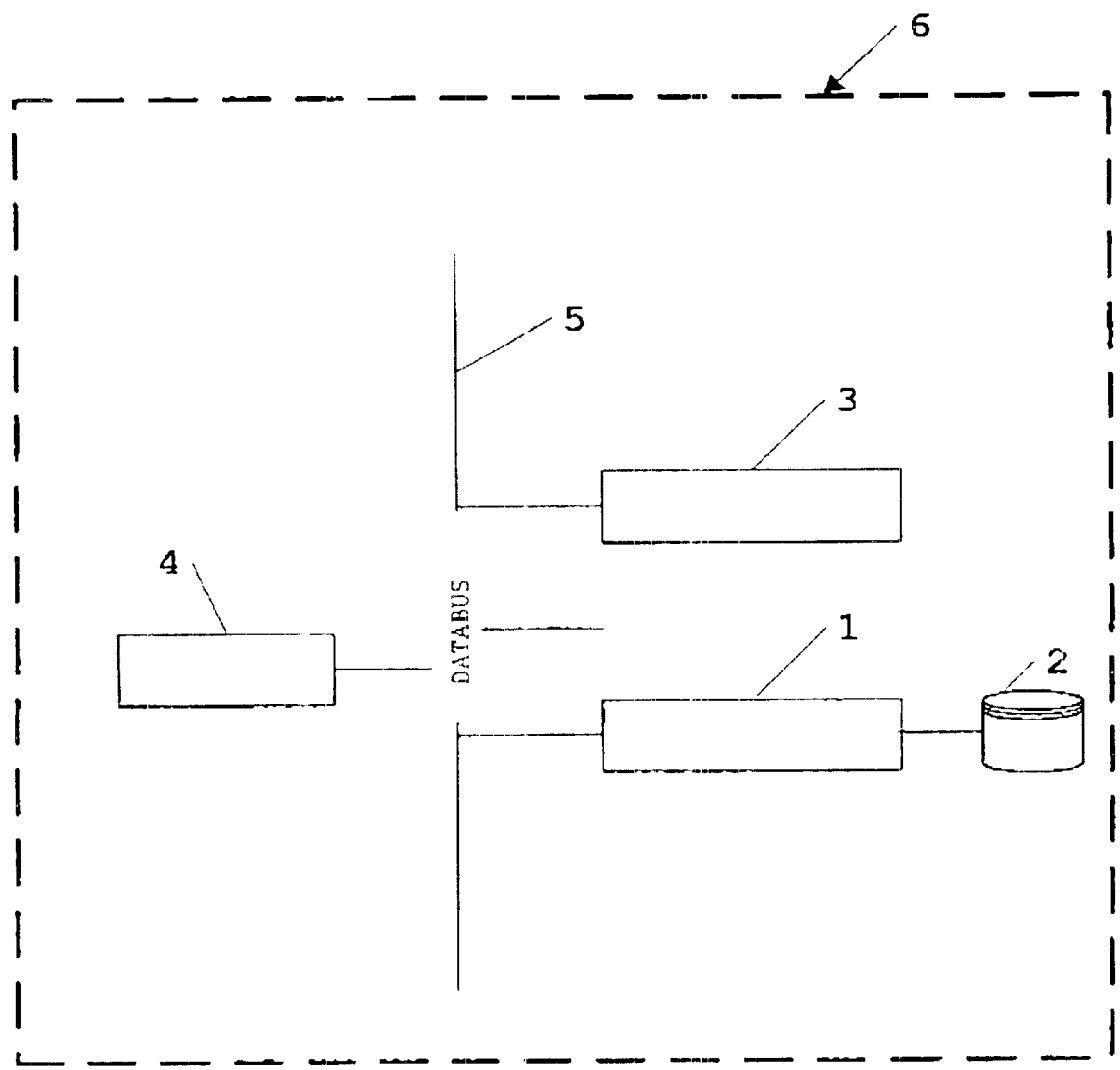
FIG. 1 illustrates a device for implementing the method according to the invention.

The data bus 5 of a vehicle 6 is illustrated schematically in FIG. 1, with controllers 1, 3, 4 connected to it. The controllers 1, 3, 4 or their software components can communicate with one another by means of the operating systems used on the controllers 1, 3, 4.

The controller 1 has a memory 2 in which data for coding the controllers 1, 3, 4 are stored, and assumes the function of coding using a software engineering service converted and implemented in controller 1. This service is henceforth designated as Automatic Variant Coding (AVC for short).

In the embodiment of FIG. 1, the data bus 5 is a CAN bus; however the process can be used with any other bus system such as, for example, MOST or FlexRay. By the coding of controllers 1, 3, 4, data records are written into the memory of the controllers 1, 3, 4 to be coded, using standards that are already established in the area of software for motor vehicles. Some of these standards are, for example, the OSEK-open system incorporated into ISO 15765-2 and its interfaces for the electronics in the motor vehicle (http://www.osek-vdx.org), as a transport protocol between controllers, or Keyword Protocol 2000 (KWP 2000) incorporated into ISO 14230 (http://www.iso.org) for the transmission of diagnostic data as well as furnishing diagnostic data.

KWP 2000 is available as a communication protocol, which is used in the motor vehicle industry as a communication protocol for diagnostic services and which meets ISO 14230. But any other communication protocol can be used to the extent that it meets the following specifications or ISO 14230.

In the process according to the invention, the data are filed in the memory 2 of central controller 1, with the data being subdivided into two regions: basic data and coding data.

The basic data contain information on the overall motor vehicle 6 and on the controllers 1, 3, 4 used therein. Moreover, the basic data also contain rules, which must be observed in coding the respective controller, as well as data for administering the coding process. The basic data also contain the date of the last coding of a controller 1, 3, 4, the last coded controller 1, 3, 4, the identification character with which a controller 1, 3, 4 can be identified through the data bus 5, the memory range for the coding data which was allocated to this controller 1, 3, 4, etc.

The coding data, on the other hand, contain the coding data for the controllers, mostly in the form of coding data records. A coding data record consists of two parts: the code identification character ID and the value allocated to this code identification character ID, VALUE. The code identification character ID or characterizing information therewith indicates an outfitting variant, for example, a special glazing. The allocated value indicates whether the outfitting variant (here special glazing), is provided in the corresponding motor vehicle 6.

In the illustrated embodiment, the allocation of the coding data to the controllers 1, 3, 4 identified in the basic data is effected with a pointer deposited in the basic data for each controller 1, 3, 4 which points to the memory range reserved for the controller 1, 3, 4. The coding data for this controller 1, 3, 4 are then filed there.

The filing of coding data for controllers 1, 3, 4 can also take place in another manner. For example, the establishment of ID's for all controllers 1, 3, 4 can take place uniformly. Then it is possible to dispense with the special allocation to controller 1, 3, 4 in connection with the corresponding coding data.

In this embodiment, the rules filed in the basic data contain the logical connection between the various code identification characters ID. The VALUE allocated to an ID can be ascertained with the aid of these rules, although this is not filed in the basic data. For example, a controller 1, 3, 4 can require information as to whether a rear hatch controller is installed. The corresponding VALUE to the required ID is not filed in memory 2. On the basis of the rules filed in the basic data, the corresponding VALUE is now determined, since it is deposited in the rules that a rear hatch controller is available only in a station wagon. It is thus established whether the motor vehicle is a station wagon or a limousine. The VALUE for the ID of the presence of a rear hatch controller can then be set and be transmitted to the coding controller 1, 3, 4.

Other rules for coding the controllers 1, 3, 4 can also be deposited, for example, on the sequence or the order of writing the coding data records into the controllers 1, 3, 4.

Coding data records consisting of ID and VALUE for a motor vehicle 6 are depicted by way of example in FIG. 3. Various outfitting variants (such as air conditioning, fifth gear, Vmax, special glass, air bags, etc.) are identified by means of the ID. The corresponding VALUE serves to code the controller. Of course, several ID-VALUE pairs can be combined into a logical unit. This is especially appropriate when a controller 1, 3, 4 calls for several VALUEs in the coding process. Thus, for example, the coding data records for calling up the 5th gear and Vmax ID's of a motor controller can be combined as a coding data record and written into the motor controller.

Figure 2:
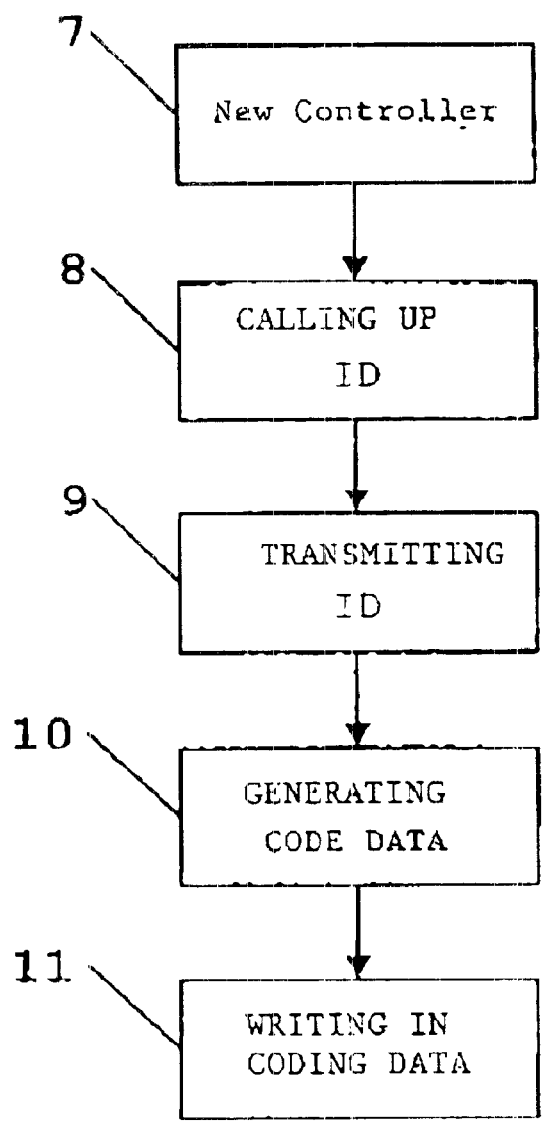
FIG. 2 illustrates a process sequence for implementing the method according to the invention.

A sequence of steps for the process according to the invention in a motor vehicle 6 described above is illustrated in FIG. 2. In this example, the controller has been newly installed in the motor vehicle 6, and is not yet coded or configured for the specified outfitting variant. The process is similar when installing or replacing any desired controller.

In step 7, the central controller 1 recognizes that a new controller is present in the networked system using the system diagnosis service. The AVC is notified about the new controller 4 by the central controller 1. Here it is inconsequential whether the new controller 4 was introduced in a controller exchange or via an additional installation into the networked system. On the basis of the system diagnosis service, the controller 1 knows which identification character designates the new controller 4 in the networked system. KWP 2000 allows the controller 1 to communicate with the new controller 4, and to write data into its memory region.

As shown in the figure, the AVC requests in the step 8 that the newly added controller 4 transmit its coding ID's to the controller 1. In step 9, the new controller 4 transmits the coding ID's that it requires for correct functioning. Here the coding ID's are transmitted in the same sequence to the controller 1, as this sequence must be maintained when writing the coding data into the new controller 4.

The controller 1 generates the coding data in step 10 using the AVC. Here, the sequences of the transmitted coding ID's, the rules for coding the controller and the coding data for the controller are observed. In particular, the allocation of the coding ID to the coding VALUE takes place at this point. If the new controller 4 is, for example, a motor control unit, in order to function properly it must know whether the transmission in the motor vehicle has a 5th gear and whether a maximum speed Vmax may not be exceeded. In this case, the new controller 4 has called up the VALUEs of the ID's "2" and "7" in step 8. The AVC can ascertain the corresponding VALUEs for these new ID's on the basis of data filed in the memory 2 and furnish them as a data record for writing into the new controller 4 while maintaining the requisite sequence.

Finally, in step 11, the AVC writes the coding data into the memory of the new controller 4 using KWP 2000. The new controller 4 is thus coded and adapted to the individual outfitting of the motor vehicle.

Measures for data security can also be introduced into the process according to the invention. For example, this can concern communication between the new controller 4 and the AVC. In particular, security measures can be used in writing the coding data into a reserved memory area of the new controller 4. Thus a simple security access algorithm can be used which can be individually configured through various parameters. For example, a simple algorithm from the Seed/Key process can be used:

$$(Ax\ x^*(\text{seed-high, seed-low})+Bx)\bmod 1000h=(\text{key-high, key-low}).$$

Controller developers can freely issue these parameters. The AVC knows these parameters, and can unlock the protected memory area of the new controller 4 using this algorithm; however, it must be ensured that these parameter data are specially protected by means of the AVC so that they cannot be read back.

The AVC is controlled such that it cannot be activated in normal operation of the motor vehicle. In this way, it is guaranteed that coding by controllers takes place only in a safe status of the motor vehicle; that is the motor vehicle is standing still and the motor is shut off. In this embodiment, the AVC is further programmed such that only a correspondingly qualified person can activate it in the workshop.

Advantageously, the process according to the invention for coding controllers can also be combined with known mechanisms for coding. In this case, as noted previously, a new controller 4 is coded via external diagnostic devices, which contain the coding data necessary for the controller 4 that must be individually set up in the approach for the outfitting variant of the motor vehicle. The diagnostic device codes the new controller 4, and the AVC is notified that the coding is taking place, via the system diagnosis service. Thereupon the AVC calls up its current coding data from the new controller. The new controller 4 transmits coding data, (ID's and corresponding VALUEs in the sequence to be observed), to the central controller 1 which filed these data in the data memory 2 using the AVC. In this way, the coding data from the external diagnostic device are available in the central controller 1 for a subsequent coding of the new controller 4.

This process can also be used for securing the customer settings of a controller in the memory 2 in the central controller 1. For example, a customer may desire a higher motor rotational speed during idling for his vehicle in relation to standard specifications. This individual setting is undertaken in a workshop using an external diagnostic device on the affected motor controller. As explained above, the AVC is notified about the coding of the affected controller and calls up the coding data of the controller for securing in memory 2.

Basically, the process according to the invention also serves for redundant storage of the coding data of a controller 1, 3, 4 in the memory unit 2 of the central controller 1. Here the coding data of a controller consisting of ID and VALUE are either called up by the AVC and filed, or have already been played on the central controller 1.

Playing the coding data of the controllers usable in the motor vehicle on the central controller 1 as well as their variations, which are planned for this purpose at this time for this type of motor vehicle, during the manufacture of the motor vehicle, is an option. In this way, coding by means of an external diagnostic device can largely be dispensed with.

The invention can likewise be used to optimize the production process. In this case, the controllers 1, 3, 4 are coded by the controller 1 in the course of the production process or especially toward the end of the production process. In this manner, only the controller 1 needs to be coded with the corresponding coding data through an external diagnostic apparatus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for configuring networked controllers in vehicles that are manufactured with selectable outfitting variants having different vehicle components, wherein:

the networked controllers exchange data via a data bus;

at least one of said controllers can be configured for various outfitting variants of the vehicle, using stored characterization information for the various outfitting variants of the vehicle;

data for configuring the controllers are stored in an outfitting variant controller of the vehicle;

a particular controller that is to be configured transmits to the outfitting variant controller, a message specifying characterizing information necessary for configuring that particular controller to accommodate an existing outfitting of particular vehicle in which the particular controller is installed;

the outfitting variant controller assembles the data for configuring the particular controller using the characterizing information and data stored in the outfitting variant controller;

the data assembled in this manner are written into a memory unit of the particular controller to configure it to the existing outfitting of the vehicle;

said data for configuring the controllers stored in the outfitting variant controller include at least one set of characterizing information and a value allocated to said at least one set of this characterizing information;

the data for configuring the controllers stored in the outfitting variant controller include rules for configuring the controllers;

said rules contain links between a plurality of sets of characterizing information, on the basis of which a value of a set of characterizing information can be ascertained.

2. The method according to claim 1, wherein data assembled for configuring the particular controller are determined on the basis of a sequence of the characterizing information transmitted by the particular controller and stored in the outfitting variant controller.

3. The method according to claim 1, wherein at least one set of characterizing information and a value thereof for the particular controller is called up by the outfitting variant controller when a controller is being installed.

4. The method according to claim 3, wherein the at least one set of characterizing information and a value thereof for the particular controller is stored by the outfitting variant controller for redundant memory in the memory unit.

5. The method according to claim 1, wherein writing the assembled data into the memory unit of the one controller takes place securely.

6. The method according to claim 5, wherein access to the memory unit of the particular controller is secured by means of a security access algorithm which can be individually configured by adjustment of parameters.

7. The method according to claim 1, wherein configuration of the particular controller can occur only in a safe operating state of the vehicle.

8. The method according to claim 7, wherein in the safe operating state, the vehicle is standing still.

9. The method according to claim 8, wherein in the safe operating state the vehicle is shut off.

10. Apparatus for performing the method according to claim 1, wherein at least one particular controller of said networked controllers is configured to adapt it to various outfitting variants of the vehicle using a stored set of characterizing information for the various outfitting variants of the vehicle, said apparatus comprising:

an outfitting variant controller with a memory unit having stored therein data for configuring controllers for different outfitting variants of the vehicle; and an executable program stored in said outfitting variant controller, which program is compiled on the basis of a sequence of characterizing information transmitted from the particular controller, as well as the rules for configuration of data for configuring the particular controller;

wherein the outfitting variant controller writes data compiled by the outfitting variant controller into the memory unit of the particular controller to configure it to a particular outfitting variant.

* * * * *